United States Patent
Rattenbury et al.

[15] 3,692,879
[45] Sept. 19, 1972

[54] POLYPHOSPHITES

[72] Inventors: Kenneth H. Rattenbury; Millard S. Larrison, both of Morgantown, W. Va.

[73] Assignee: Watson Chemical Corporation, New York, N.Y.; by said Rattenbury

[22] Filed: Jan. 15, 1970

[21] Appl. No.: 3,247

[52] U.S. Cl. ............260/928, 252/46.6, 252/400, 260/45.7 PS, 260/45.95, 260/294.8 K, 260/329 P, 260/348 R, 260/398.5, 260/609 R, 260/609 F, 260/814, 260/929, 260/930, 260/967, 260/976
[51] Int. Cl. .........C07f 9/06, C10m 1/48, C08f 45/58
[58] Field of Search.....................260/928, 929, 930

[56] References Cited
UNITED STATES PATENTS
3,489,803   1/1970   Maier ....................260/928 X

*Primary Examiner*—Lewis Gotts
*Assistant Examiner*—Anton H. Sutto
*Attorney*—Cushman, Darby & Cushman

[57] ABSTRACT

Compounds are prepared having the formula

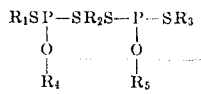

where $R_1$ and $R_3$ are alkyl, haloalkyl, aryl, haloaryl, alkenyl, aralkyl, haloalkenyl, cycloalkyl, $R_2$ is a divalent aromatic, aliphatic or cycloaliphatic group and $R_4$ and $R_5$ are aryl or haloaryl.

The compounds are useful as antioxidants.

7 Claims, No Drawings

POLYPHOSPHITES

The present invention relates to the preparation of novel thiophosphites.

The compounds have the general formula

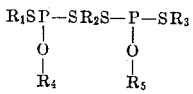   I where $R_1$ and $R_3$ are alkyl, haloalkyl, aryl, haloaryl, alkenyl, aralkyl, haloalkenyl, cycloalkyl, $R_2$ is a divalent aromatic, aliphatic or cycloaliphatic group and $R_4$ and $R_5$ are aryl or haloaryl. Preferably $R_2$ is alkylene of at least two carbon atoms, cycloalkylene or arylene.

The compounds of the present invention are useful as antioxidants, e.g. for polyethylene, polypropylene, EPDM rubber, vinyl chloride resins, foods, lubricating oils, natural rubber, polybutadiene, butadiene-styrene copolymer, butadiene-acrylonitrile copolymer, acrylonitrile-butadiene-styrene terpolymer (ABS), poly cis-isoprene, polyesters, etc.

The compounds of the present invention are conveniently made by reacting one mole of a phenol, one mole of a mercaptan (including thiophenols), 0.5 mole of a dimercaptan and one mole of phosphorus trichloride and removing the HCl formula. Preferably a slight excess of the phenol is employed. The formula set forth above is for only one of the possible isomers. Actually the mercaptan and phenol react at random so that some molecules will have the formula

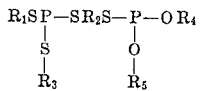   II while others will have formula I. There can also be used mixtures of mercaptans and mixtures of phenols rather than a single mercaptan or phenol. As the mercaptan there can be used methyl mercaptan, ethyl mercaptan, propyl mercaptan, butyl mercaptan, sec. butyl mercaptan, t-butyl mercaptan, isobutyl mercaptan, amyl mercaptan, hexyl mercaptan heptyl mercaptan, octyl mercaptan, isooctyl mercaptan, 2-ethylhexyl mercaptan, nonyl mercaptan, decyl mercaptan, isodecyl mercaptan, dodecyl mercaptan, t-dodecyl mercaptan, hexadecyl mercaptan (cetyl mercaptan), octadecyl mercaptan, eicosanyl mercaptan, chloroethyl mercaptan, 3-chloropropyl mercaptan, 2-chloropropyl mercaptan, 4-chlorobutyl mercaptan, 6-chlorohexyl mercaptan, 10-chlorodecyl mercaptan, 18-chlorooctadecyl mercaptan, 20-chloroeicosanyl mercaptan, allyl mercaptan (propenethiol), α-naphthyl mercaptan, βnaphthyl mercaptan, crotyl mercaptan, pentene 4-thiol, oleyl mercaptan, 2-bromoethyl mercaptan, 4-bromobutyl mercaptan, thiophenol, 2-methyl benzenethiol, 3-methyl benzene thiol, 4-methyl benzene thiol (p-thiocresol), 4-butylbenzenethiol, 4-octylbenzenethiol, 2-dodecylbenzenethiol, 4-nonylbenzenethiol, 2, 4,6-trimethylbenzenethiol, 2,6-dimethylbenzenethiol (thioxylenol), 2-chlorobenzenethiol, 4-chlorobenzenethiol, 3-bromobenzenethiol, 2,4-dichlorobenzenethiol, 2-chloro-4-methylbenzenethiol, benzyl mercaptan, cyclohexyl mercaptan, cyclopentyl mercaptan, mercapto- α-terpinene, mercapto phellandrene, mercapto sylvestrene, 2-mercaptopyridine, 5-mercaptopyridine, mercaptothiophene, 2-mercapto methylcyclohexane.

As the phenol there can be used phenol, o-cresol, m-cresol, p-cresol, α-naphthol, β-naphthol, 4-butylphenol, 4-octylphenol, 2-dodecylphenol, 4-nonylphenol, 4-isooctylphenol, 2,4,6-trimethylphenol, 2,6-xylenol, 2-chlorophenol, 4-chlorophenol, 3-bromophenol, 2,4-dichlorophenol, 2-chloro-4-methylphenol, 2,4,5-trichlorophenol, p-octadecylphenol, 2,4-di(octadecyl) phenol, p-fluorophenol.

As examples of dimercaptans there can be employed 1,2-dimercapto ethane, 1,3-dimercapto propane, 1,2-dimercaptopropane, 1,4-dimercaptobutane, 1,5-dimercaptopentane, 1,6-dimercaptohexane, 1,8-dimercaptooctane, 2,3-dimercaptopentadecane, 1,15-dimercaptopentadecane, 1,6-dimercaptoeicosane, 1,20-dimercaptoeicosane, 1,4-dimercapto-2-butene, 1,8-dimercapto-2-octene, dimercaptoethyl ether, dimercaptopropyl ether, dimercapto diethyl sulfide, dimercapto dipropyl sulfide, dimercapto tetraethylene glycol, dimercapto dipropylene glycol, dimercapto tripropylene glycol, bis(mercaptooctyl)ether, bis(mercaptooctyl)thioether, 2,9-p-menthane dithiol, dimercapto alpha terpinene, dimercapto phellandrene, dimercapto sylvestrene, 2,5-dimercapto pyridine, dimercaptothiophene, dimercapto p-dioxane, dimercapto xylene, 1,3-dimercapto 2-methylbenzene, 1,4-dimercapto 2-methylbenzene, p-dimercaptobenzene, 1,4-dimercapto cyclohexane, 1,4-dimercapto-2-methyl cyclohexane, isopropylidene bis(4-mercaptobenzene), methylene bis(4-mercaptobenzene), ethylidene bis(4-mercaptobenzene), isopropylidene bis(4-mercaptocyclohexane), methylene bis(4-mercaptocyclohexane), ethylidene bis(4-mercaptocyclohexane), 1,4 bis(mercaptomethyl) benzene, 1,3 bis(mercaptomethyl) benzene, 1,4 bis(mercaptomethyl) cyclohexane, 1,3 dimercapto cyclopentane, 1,8-dimercaptonaphthalene.

Examples of thiophosphites within the present invention include diphenyl di(mercaptoethyl) 1,2-dimercaptoethylene diphosphite (having the formula

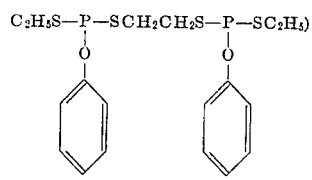

diphenyl di(mercaptohexyl) 1,2-dimercaptoethylene diphosphite, diphenyl di(mercaptolauryl) 1,2-dimercaptoethylene diphosphite, diphenyl di(mercaptobutyl) 1,2-dimercaptopropylene diphosphite, diphenyl di(mercaptoisopropyl) 1,3-dimercaptopropylene diphosphite, diphenyl di(mercaptomethyl) 1,6-dimercaptohexylene diphosphite, phenyl p-tolyl mercaptoethyl mercaptopropyl 1,6-dimercaptohexylene diphosphite, diphenyl di(mercapto t-butyl) 1,6-dimercapto hexylene diphosphite, diphenyl (mercapto sec. butyl) 1,6-dimercaptohexylene diphosphite, diphenyl di(mercaptohexyl) 1,6-dimercaptohexylene diphosphite, diphenyl di(mercapto 2-ethylhexyl) 1,6-dimercaptohexylene diphosphite, diphenyl di(mercaptolauryl) 1,6-dimercaptohexylene diphosphite, diphenyl di(mercaptodecyl) 1,6-dimercaptohexylene diphosphite, diphenyl di(mercaptohexadecyl) 1,6-dimercaptohexylene diphosphite, diphenyl di(mercaptoisodecyl) 1,6-dimercaptohexylene diphosphite, diphenyl di(mercaptooctadecyl) 1,6-dimercaptohexylene diphosphite, diphenyl di(mercaptoeicosanyl) 1,6-dimercaptohexylene diphosphite, diphenyl di(mercaptobenzyl) 1,6-dimercaptohexylene diphosphite, diphenyl di(mercaptocyclopentyl) 1,6-dimercaptohexylene diphosphite, diphenyl di(mercaptocyclohexyl) 1,6-dimercaptohexylene diphosphite, diphenyl di(3-mercaptomethylcyclohexyl) 1,6-dimercaptohexylene diphosphite, diphenyl di(4-mercaptomethylcyclohexyl) 1,6-dimercaptohexylene diphosphite, diphenyl di(2-chloro-1-mercaptoethyl) 1,6-dimercaptohexylene diphosphite, diphenyl di(3-chloro-1-mercaptopropyl) 1,6-dimercaptohexylene diphosphite, diphenyl di(mercapto alpha terpinyl) 1,6-dimercaptohexylene diphosphite, diphenyl di(5-mercaptopyridyl) 1,6-dimercaptohexylene diphosphite, diphenyl di(mercaptomethyl) 1,6-dimercaptohexylene diphosphite, diphenyl di(4-bromomercaptobutyl) 1,6-dimercaptohexylene diphosphite, diphenyl di(mercaptophenyl) 1,6-dimercaptohexylene diphosphite, diphenyl di(mercaptoallyl) 1,6-dimercaptohexylene diphosphite, diphenyl di(mercapto 2-chloroallyl) 1,6-dimercaptohexylene diphosphite, diphenyl di(4-methyl-1-mercaptophenyl) 1,6-dimercaptohexylene diphosphite, diphenyl di(2,6-dimethyl-1-mercaptophenyl) 1,6-dimercaptohexylene diphosphite, diphenyl di(2,4,6-trimethyl-1-mercaptophenyl) 1,6-dimercaptohexylene diphosphite, diphenyl di(4-butyl-1-mercaptophenyl) 1,6-dimercaptohexylene diphosphite, diphenyl di(2-octyl-1-mercaptophenyl) 1,6-dimercaptohexylene diphosphite, diphenyl di(4-nonyl-1-mercaptophenyl) 1,6-dimercaptohexylene diphosphite, diphenyl di(3-dodecyl-1-mercaptophenyl) 1,6-dimercaptohexylene diphosphite, diphenyl di(2-bromo-1-mercaptophenyl) 1,6-dimercaptohexylene diphosphite, diphenyl di(4-bromo-1-mercaptophenyl) 1,6-dimercaptohexylene diphosphite, diphenyl di(mercaptolauryl) 1,4-dimercaptobutylene diphosphite, diphenyl di(mercaptophenyl) 1,6-dimercaptoeicosanylene diphosphite, diphenyl di(mercaptodecyl) 1,20-dimercaptoeicosanylene diphosphite, diphenyl di(mercaptolauryl) β,β'-dimercapto ethyl ether diphosphite, diphenyl di(4-nonyl-1-mercaptophenyl) 3,3'-dimercapto propyl ether diphosphite, diphenyl di(mercaptoisodecyl) 1,4-dithiobutene-2 diphosphite, diphenyl di(mercaptooleyl) 1,6-dimercaptohexylene diphosphite, diphenyl di(mercaptocetyl) 2,2'-dimercaptoethyl ether diphosphite, diphenyl di(mercaptoisodecyl) dimercapto butylene glycol diphosphite, diphenyl di(mercaptophenyl) dimercapto dipropylene glycol diphosphite, diphenyl di(4-nonyl-1-mercaptophenyl) dimercapto tetraethylene glycol diphosphite, diphenyl di(mercaptolauryl) omega, omega' dimercaptooctylthioether diphosphite, diphenyl di(mercaptolauryl) omega, omega' dimercaptooctylether diphosphite, diphenyl di(mercaptolauryl) 2,9-dimercapto-p-menthylene diphosphite, diphenyl di(mercaptophenyl) 2,9-dimercapto-p-menthylenediphosphite, diphenyl di(alpha mercaptonaphthyl) 2,9-dimercapto-p-menthylene diphosphite, diphenyl di(mercaptolauryl) 2,5-dimercapto pyridine diphosphite, diphenyl di(mercaptooctyl) 2,4-dimercaptothiophene diphosphite, diphenyl di(mercaptolauryl) p-dimercaptophenylene diphosphite, diphenyl di(o-octyl mercaptophenyl) p-dimercaptophenyl diphosphite, diphenyl di(mercaptolauryl) 2-methyl-1,4-dimercaptocyclohexylene diphosphite, diphenyl di(mercaptocetyl) 1,4-dimercaptocyclohexylene diphosphite, diphenyl di(mercaptolauryl) isopropylidene bis(4-mercaptobenzene) diphosphite, diphenyl di(mercaptophenyl) isopropylidene bis(4-mercaptobenzene) diphosphite, diphenyl di(mercaptolauryl) 1,4-bis(mercaptomethyl) benzene diphosphite, diphenyl di(mercaptolauryl) 1,4-bis(mercaptomethyl) cyclohexane diphosphite, diphenyl di(mercaptolauryl) 1,3-dimercaptocyclopentylene diphosphite, diphenyl di(mercaptolauryl) 1,8-di(mercaptonaphthalene diphosphite, di(p-tolyl) di(mercaptolauryl) 1,2-dimercaptoethylene diphosphite, di(o-tolyl) di(mercaptophenyl) 1,6-dimercaptohexylene diphosphite, di(p-nonylphenyl) di(mercaptolauryl 1,6-dimercaptohexylene diphosphite, di(2,6-xylenyl) di(mercaptooctyl) 1,2-dimercaptoethylene diphosphite, di(3-chlorophenyl) di(mercaptolauryl) 1,2-dimercaptoethylene diphosphite, di(2,4-dichlorophenyl) di(mercaptocyclohexyl) 1,6-dimercaptohexylene diphosphite, di(2,4,5-trichlorophenyl) di(mercaptolauryl) 1,2-dimercaptoethylene diphosphite, di(2-chloro-4-methylphenyl) di(mercaptolauryl) 1,2-dimercaptoethylene diphosphite, di(α-naphthyl) di(mercaptoisooctyl) 1,2-dimercaptoethylene diphosphite, di(4-fluorophenyl) di(mercaptolauryl) 1,2-dimercaptoethylene diphosphite.

Unless otherwise indicated all parts and percentages are by weight.

The compounds of the present invention are useful as antioxidants and stabilizers for halogen containing resins, preferably vinyl chloride resins.

As the halogen containing resins there can be used resins made from vinylidene compounds such as vinyl chloride, vinylidene chloride, vinyl chloroacetate, chlorostyrenes, vinyl bromide and chlorobutadienes.

Such vinylidene compounds may be polymerized alone or in admixture with each other or with vinylidene compounds free from halogen. Among the halogen free materials which can be copolymerized with the halogen containing vinylidene compounds, e.g. vinyl chloride, are vinyl esters of carboxylic acids, e.g. vinyl acetates, vinyl propionate, vinyl butyrate and vinyl benzoate, esters of unsaturated acids e.g., alkyl and alkenyl acrylates such as methyl acrylate, ethyl acrylate, propyl acrylate, butyl acrylate and allyl acrylate as well as the corresponding methacrylates, e.g. methyl methacrylate and butyl methacrylate, vinyl aromatic compounds, e.g. styrene, p-ethyl styrene, divinyl benzene, vinyl naphthalene, α-methyl styrene, p-methyl styrene, dienes such as butadiene and isoprene, unsaturated amides such as acrylamide, methacrylamide and acrylanilide and the esters of α,β- unsaturated carboxylic acids, e.g. the methyl, ethyl, propyl, butyl, amyl, hexyl, heptyl, octyl, allyl, methallyl and phenyl esters of maleic, crotonic, itaconic and fumaric acids and the like. Specific examples of such esters are diethyl maleate, dibutyl maleate and dibutyl fumarate.

The copolymers in which at least 50 percent of the copolymer is made from a halogen containing vinylidene compound such as vinyl chloride are preferably treated according to the invention.

The stabilizers of the present invention are also effective when intimately mixed with halogen containing resins in which part or all of the halogen is introduced into a preformed resin, e.g. chlorinated polyvinyl acetate, chlorinated polystyrene, chlorinated polyethylene, chlorinated polyvinyl chloride, chlorinated natural and synthetic rubbers and rubber hydrochloride.

Typical examples of copolymers include vinyl chloride-vinyl acetate (95:5 weight ratio), vinyl chloride-vinyl acetate (87:13 weight ratio), vinyl chloride-vinyl acetatemaleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The resin, e.g. polyvinyl chloride, can either be plasticized or unplasticized. As the plasticizer there can be employed conventional materials such as dioctyl phthalate, octyl decyl phthalate, tricresyl phosphate, 2-ethylhexyl diphenyl phosphate, dodecyl dicresyl phosphate, tributyl acetyl citrate, dioctyl sebacate, dibutyl sebacate, etc. The plasticizer is used in conventional amount e.g. 10 to 100 parts for each 100 parts of the vinyl chloride containing resin.

The mercapto containing stabilizers of the present invention are used in an amount of 0.05 to 20 parts, preferably 0.1 to 10 parts per 100 parts of halogen containing resin.

There can also be incorporated 0.1 to 10 parts per 100 parts of the halogen containing resin of a metal salt stabilizer. Thus, there can be used barium, strontium, calcium, cadmium, zinc, lead, tin, magnesium, cobalt, nickel, titanium and aluminum salts of phenols, aromatic carboxylic acids, fatty acids and epoxy fatty acids.

Examples of suitable salts include barium di(nonylphenolate), strontium di(nonylphenolate), strontium di(amylphenolate), barium di(octylphenolate), strontium di(octylphenolate), barium di(nonyl-o-cresolate), lead di(octylphenolate), cadmium-2-ethylhexoate, cadmium laurate, cadmium stearate, zinc caprylate, cadmium caproate, barium stearate, barium 2-ethylhexoate, barium laurate, barium ricinoleate, lead stearate, aluminum stearate, magnesium stearate, calcium octoate, calcium stearate, cadmium naphthenate, cadmium benzoate, cadmium p-tert, butylbenzoate, barium octyl salicylate, cadmium epoxy stearate, strontium epoxy stearate, cadmium salt of epoxidized acids of soybean oil, and lead epoxy stearate.

In plastisol formulations, there is preferably also included from 0.1 to 10 parts per 100 parts of resin of an epoxy vegetable oil such as epoxidized soybean oil or epoxidized tall oil.

Also there can be incorporated a phosphite, e.g. an alkyl, aryl or aralkyl phosphite in an amount of 0.1 to 10 parts per 100 parts of resin. Typical of such phosphites are triphenyl phosphite, tris decyl phosphite, decyl diphenyl phosphite, di(p-tert. butylphenyl) phenyl phosphite, diphenyl o-cresyl phosphite, trioctyl phosphite, tricresyl phosphite and tribenzyl phosphite.

The compounds of the present invention are also stabilizers for monolefin polymers such as polyethylene, polypropylene, ethylene propylene copolymers (e.g. 50:50, 80:20 and 20:80), ethylene monoolefin copolymers wherein the monoolefin has four to 10carbon atoms and is present in a minor amount, e.g. ethylene-butene-1 copolymer (95:5) and ethylene-decene-1 copolymer (90:10). Furthermore, they can be used to stabilize natural rubber, styrene-butadiene rubber (SBR rubber), e.g. (75 percent butadiene, 25 percent styrene) and EPDM rubbers and acrylonitrile-butadiene-styrene terpolymers (ABS).

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent) propylene and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims the term nonconjugated polyolefin includes aliphatic unconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclooctadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g., ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in U.S. Pat. Nos. 2,933,480; 3,000,866; 3,063,973; 3,093,620; 3,093,621, and 3,136,739, in British Pat. No. 880,904 and in Belgian Pat. No. 623,698.

Terpolymers and other EPDM rubbers from ethylene, propylene and dicyclopentadiene are exemplified in Tarney, U.S. Pat. No. 3,000,866; Adamek U.S. Pat. No. 3,136,739 and Dunlop (British) Pat. No. 880,904. EPDM rubbers from ethylene, propylene and 1,4-hexadiene are exemplified in Gresham U.S. Pat. No. 2,933,480. As in Gresham other suitable nonconjugated diolefins are 1,4-pentadiene; 2-methyl-1,5 hexadiene, 3,3-dimethyl-1, 5-hexadiene, 1,7-octadiene, 1,9-decadiene, 1,19-eicosadiene, 1,9-octadecadiene, 6-methyl-1,5-heptadiene, methyl-1,6-octadiene, 11-ethyl-1,11-tridecadiene.

EPDM rubbers from ethylene, propylene and 5-methyl-2-norbornene are exemplified in U.S. Pat. No. 3,093,621. Suitable norbornadiene, e.g., 2-methyl norbornadiene, 2-ethyl norbornadiene, 2-n-heptyl norbornadiene are shown in Gladding U.S. Pat. No. 3,063,973 and bicyclo compounds such as bicyclo (2,2,2) heptadiene-2,5 are shown in Dunlop (British) Pat. No. 880,904. The use of cyclooctadiene-1,5 and other cyclodienes is shown in Montecatini (Belgium) Pat. No. 623,698. Thus these can be used in making the EPDM elastomer 1,4-cycloheptadiene, 1,4-cyclooctadiene, 1,6-cyclodecadiene, 1,5-cyclododecadiene, 1,7-cyclodecadiene, 1,5,9-cyclododecatriene, 1-methyl-1,5-cyclooctadiene.

The compounds of the present invention are normally employed in an amount of at least 0.01 percent and usually 0.1 percent to 10 percent by weight of the polymer they are intended to stabilize.

They can also be used as synergistic stabilizers with other sulfur containing compounds. Thus, there can be employed therewith neutral sulfur compounds having a thio linkage beta to a carbon atom having both a hydrogen atom and a carboxyl group attached thereto. Such compounds are used in an amount of 0.01 to 10 percent, preferably 0.1 – 5 percent. Thus there can be used pentaerythritol tetra (mercaptoacetate), 1,1,1-trimethylolethane tri (mercaptoacetate), 1,1,1-trimethylolpropane tri (mercaptoacetate), dioleyl thiodipropionate, dilauryl thiodipropionate, other thio compounds include distearyl 3,3'-thiodipropionate, dicyclohexyl-3,3'-thiodipropionate, dicetyl-3,3'-thiodipropionate, dioctyl-3,3'-thiodipropionate, dibenzyl-3,3'-thiodipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, dibenzyl-3,3'-thiodipropionate, diethyl-3,3'-thiodipropionate, lauryl ester of 3-methylmercapto propionic acid, lauryl ester of 3-butylmercapto propionic acid, lauryl ester of 3-laurylmercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3-cyclohexylmercapto propionic acid, lauryl ester of 3-hydroxymethylmercapto propionic acid, myristyl ester of 3-hydroxyethylmercapto propionic acid, octyl ester of 3-methoxymethylmercapto propionic acid, dilauryl ester of 3-hydroxymethylmercapto propionic acid, myristyl ester of 3-hydroxyethylmercapto propionic acid, octyl ester of 3-methoxymethylmercapto propionic acid, dilauryl ester of 3-carboxylmethylmercapto propionic acid, dilauryl ester of 3-carboxypropylmercapto propionic acid, dilauryl-4,7-dithiasebacate, dilauryl-4,7,8,11-tetrathiotetradecandioate, dimyristyl-4,11-dithiatetradecandioate lauryl-3-benzothiazylmercaptopropionate. Preferably the esterifying alcohol is an alkanol having 10 to 18 carbon atoms. Other esters of beta thiocarboxylic acids set forth in Gribbins U.S. Pat. No. 2,519,744 can also be used.

Other beta thiocarboxylic acids include stearyl (1,2-dicarboethoxyethylthio) acetate, stearyl (1,2-dicarbolauryloxyethylthio) acetate or the like. Compounds of this type can be made by addition of alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilauryl maleate, phenylthiodioctyl maleate, cetyl (1,2-dicarboethoxyethylthio) propionate and benzylthiodimyristyl maleate.

Similarly useful beta thiocarboxyl synergistic compounds can be prepared by addition of the RSH (mercaptan) compounds as defined above across the double bond of dialkyl itaconates, citraconates, fumarates or trialkyl aconitates, e.g. the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the addition product of the lauryl ester of mercaptopropionic acid with triethyl aconitate.

The thermal stability of the polypropylene and other monoolefin polymer is adversely affected by impurities including residual catalyst. When thermal stability is important in addition to oxidative stability it has been found valuable to include polyvalent metal salts of fatty acids in an amount of 0.01–10 percent preferably 0.1–5 percent, in the monoolefin polymer formulations. Examples of such salts are calcium stearate, calcium 2-ethylhexoate, calcium octate, calcium oleate, calcium ricinoleate, calcium myristate, calcium palmitate, calcium laurate, barium laurate, barium stearate, magnesium stearate as well as zinc stearate, cadmium laurate, cadmium octoate, cadmium stearate and the other polyvalent metal salts of fatty acids set forth previously.

There can also be added phenolic antioxidants in an amount of 0.01–10 percent, preferably 0.1–5 percent. Examples of such phenols include 2,6-di-t-butyl-p-cresol, butylated hydroxyanisole, propyl gallate, 4,4'thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone mono-benzyl ether, 2,2'-methylene-bis(4-methyl-6-t-butylphenol), 2,6-butyl-4-decyloxyphenol, 2-t-butyl-4-dodecoxyphenol, 2-t-butyl-4-dodecyloxyphenol, 2-t-butyl-4-octadecyloxyphenol, 4,4'-methylene-bis(2,6-di-t-butylphenol), p-aminophenol, N-lauryloxy-p-aminophenol, 4,4'-thiobis(3-methyl-6-t-butylphenol), bis[o-(1,1,3,3-tetramethylbutyl)phenol]sulfide, 4-acetyl-β-resorcylic acid, A stage p-t-butylphenolformaldehyde resin, 4-dodecyloxy-2-hydroxybenzophenone, 3-hydroxy-4-(phenylcarbonyl)phenyl palmitate, n-dodecyl ester of 3-hydroxy-4-(phenylcarbonyl) phenoxyacetic acid, and t-butylphenol.

The use of epoxy compounds in an amount of 0.01–5 percent in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin-bisphenol A resins (epichlorhydrindiphenylolpropane resins), phenoxy-propylene oxide, butoxypropylene oxide, epoxidized neopentylene oleate, glycidyl epoxystearate, epoxidized α-olefins, epoxidized glycidyl soyate, dicyclopentadiene dioxide, epoxidized butyl tollate, styrene oxide, dipentene dioxide, glycidol, vinyl cyclohexene dioxide, glycidyl ether of resorcinol, glycidol ether of hydroquinone, glycidyl ether of 1,5-dihydroxynaphthalene, epoxidized linseed oil fatty acids, allyl glycidyl ether, butyl glycidyl ether, cyclohexane oxide, 4-(2,3-epoxypropoxy)

acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

The compounds of the present invention can also be employed in conjunction with other phosphorus compounds, particularly phosphites and thiophosphites as antioxidants and stabilizers. The phosphite or thiophosphite is employed in an amount of 0.01 to 10 percent of the polymer (or other material) being stabilized. Thus there can be employed tristearyl phosphite, trilauryl trithiophosphite, trilauryl phosphite or any of the phosphites or thiophosphites in Friedman U.S. Pat. No. 3,039,993, Friedman U.S. Pat. Nos. 3,047,608, 3,053,878 or Larrison U.S. Pat. No. 3,341,629.

EXAMPLE 1

Diphenyl Di(Mercaptolauryl) 1,2-Dimercaptoethylene Diphosphite $$C_{12}H_{25}S-\underset{\underset{OC_6H_5}{|}}{P}-SC_2H_4S-\underset{\underset{OC_6H_5}{|}}{P}-SC_2H_5$$

The compound was prepared as follows:
47.0 grams (0.5 mole) of ethanedithiol, 202 grams (1.0 mole) of n-dodecyl mercaptan and 104 grams (1.1 moles) of phenol were placed in a 3 necked one liter flask. The mixture was heated to 45° C. and then 137 grams (1.0 mole) of $PCl_3$ were added dropwise at 45°–80 C. while continuously evolving HCl. The crude product was then heated to 140° C. at atmospheric pressure followed by placing the system under vacuum (25 Torr to remove residual HCl. Excess phenol was then removed to 210° C. at a pressure of 2 mm. The liquid product of the invention weighed 355 grams and had the following properties

| | | |
|---|---|---|
| Refractive Index | $n_D^{25}$ | 1.5457 |
| Specific Gravity | 25°C./25°C. | 1.038 |
| Color, APHA | | 0 |
| Phosphorus | | 8.3% |
| Sulfur | | 8.6% |

EXAMPLE 2

Di(p-tolyl) Di(Mercaptodecyl) 1,6-Di-Mercapto-Hexylene Diphosphite

The procedure of example 1 was repeated using 0.5 mole of 1,6-hexanedithiol, 1.0 mole of decyl mercaptan and 1.1 mole of p-cresol and the dropwise addition of 1.0 mole of $PCl_3$ to produce the clear liquid product.

EXAMPLE 3

Diphenyl Di(Mercaptolauryl) 2,9-Dimercapto-p-Menthylene Diphosphite

The procedure of example 1 was repeated using 0.5 mole of 2,9-p-menthanedithiol, 1.0 mole of lauryl mercaptan, 1.1 moles of phenol and 1.0 mole of $PCl_2$ to produce the liquid product.

EXAMPLE 4

Diphenyl Di(Mercaptolauryl) β,β'-Dimercaptoethyl Ether Diphosphite

The procedure of example 1 was repeated using 0.5 mole of β,β'-dimercaptoethyl ether, 1.0 mole of lauryl mercaptan, 1.1 moles of phenol and 1.0 mole of $PCl_3$ to produce the liquid product.

EXAMPLE 5

1 part of the product of example 2 was mixed with 100 parts of rigid polyvinyl chloride.

EXAMPLE 6

1 part of the product of example 1 was mixed with 100 parts of vinyl chloride resin also containing 60 parts of dioctyl phthalate and 1 part of barium cadmium laurate to give a stabilized product.

EXAMPLE 7

1 part of the product of example 3 was mixed with 100 parts of polypropylene to stabilize the polymer.

EXAMPLE 8

1 part of the product of example 4 was mixed with 100 parts of natural rubber to stabilize the rubber.

EXAMPLE 9

1 part of the product of example 1 was mixed with 100 parts of EPDM rubber (55 mole percent ethylene, 41 mole percent propylene and 4 mole percent dicyclopentadiene) to stabilize the rubber.

EXAMPLE 10

100 parts of propylene (melt index 0.4) was mixed with a stabilizer consisting of 0.2 parts of the product of example 1, 0.2 parts dilaurylthiodipropionate and 0.2 parts of calcium stearate to give a polypropylene of improved heat stability, e.g. at 133° C.

EXAMPLE 11

100 parts of polypropylene (melt index 0.4) were mixed with a stabilizer consisting of 0.25 parts of the product of example 2 and 0.25 parts of dilauryl thiodipropionate to give a polypropylene of improved stability.

EXAMPLE 12

100 parts of polypropylene (melt index 0.4) was mixed with a stabilizer consisting of 0.2 parts of the product of example 3, 0.2 parts of dilaurylthiodipropionate and 0.2 parts of 2,2'-methylene bis(4-methyl-6-t-butylphenol).

What is claimed is:

1. A compound having the formula $$R_1SP-SR_2S-P-SR_3$$
$$\underset{R_4}{\overset{|}{O}} \quad \underset{R_5}{\overset{|}{O}}$$

where $R_1$ and $R_3$ are alkyl of one to 20 carbon atoms, phenyl, alkylphenyl having up to 18 carbon atoms in the alkyl group, naphthyl, halophenyl where the halogen has an atomic weight of 35 to 80, methyl chlorophenyl, alkenyl of three to 20 carbon atom, benzyl, cycloalkyl having five to six carbon atoms in the ring, cycloalkylene, $R_2$ is alkylene of two to 20, cycloalkylene having five to six carbon atoms in the cycloalkylene ring, arylene of the group consisting of phenylene, methyl phenylene, one to three carbon alkane bisphenyl and naphthylene, divalent alkene having four to eight carbon atoms, alkyleneoxyalkylene having two to eight carbon atoms in each alkylene group, poly (alkyleneoxy)alkylene having two to three carbon atoms in each alkylene group and two to three oxygen atoms, alkylenethioalkylene having two to eight carbon atoms in each alkylene group, methylene, terpinylene, phellandrenylene, or sylvestrenylene, $R_4$ and $R_5$ are phenyl, alkyl phenyl having up to 18 carbon atoms in the alkyl group and halophenyl where the halogen is fluorine, chlorine or bromine.

2. A compound according to claim 1 wherein $R_2$ is alkylene, cycloalkylene, arylene, alkyleneoxyalkylene or alkylenethioalkylene.

3. A compound according to claim 1 wherein $R_1$ and $R_3$ are alkyl of one to 20 carbon atoms, phenyl, alkylphenyl having up to 18 carbon atoms in the alkyl group, halophenyl where the halogen has an atomic weight of 35 to 80, alkenyl of three to 20 carbon atoms, benzyl, or cycloalkyl having five to six carbon atoms in the ring.

4. A compound according to claim 3 wherein $R_4$ and $R_5$ are phenyl.

5. A compound according to claim 3 wherein $R_2$ is alkylene, cycloalkylene, menthylene or arylene.

6. A compound according to claim 5 wherein $R_2$ is alkylene.

7. A compound according to claim 6 wherein $R_4$ and $R_5$ are phenyl.

* * * * *